United States Patent [19]
Nichols

[11] 3,732,668
[45] May 15, 1973

[54] FUEL TANK INERTING SYSTEM

[75] Inventor: Richard A. Nichols, Santa Ana, Calif.

[73] Assignee: Parker-Hannifin Corporation, Cleveland, Ohio

[22] Filed: Feb. 24, 1971

[21] Appl. No.: 118,300

[52] U.S. Cl. .................55/160, 55/53, 55/196, 220/88 B, 261/77
[51] Int. Cl. .................B01d 19/00
[58] Field of Search.................55/18, 21, 47, 53, 55/160, 182, 196; 220/88 B; 261/77, 121; 62/1, 50, 52

[56] References Cited

UNITED STATES PATENTS

| 2,127,571 | 8/1938 | Pardee, Jr. | 23/154 |
| 2,487,863 | 11/1949 | Garretson | 62/1 |
| 2,764,873 | 10/1956 | Mooyaart | 62/1 |
| 2,912,830 | 11/1959 | Coldren | 62/50 |
| 3,302,418 | 2/1967 | Walter | 62/52 |
| 3,229,446 | 1/1966 | Sebastien et al | 55/53 |
| 3,590,553 | 7/1971 | Bragg et al. | 55/160 |

Primary Examiner—Samih N. Zaharna
Assistant Examiner—R. W. Burks
Attorney—John N. Wolfram

[57] ABSTRACT

A system for inerting aircraft fuel tanks comprising mixing of the fuel and an inert gas within a tube whereby the inert gas scrubs the fuel of oxygen dissolved therein and dilutes the same, the mixture being discharged from the tube into the fuel tank where the inert gas and the oxygen rise to the tank vapor space where a portion of the same may be vented to atmosphere but in any case the oxygen content in the vapor space is less than about 12 percent whereby flame and explosion cannot propagate within the tank.

8 Claims, 4 Drawing Figures

PATENTED MAY 15 1973
3,732,668
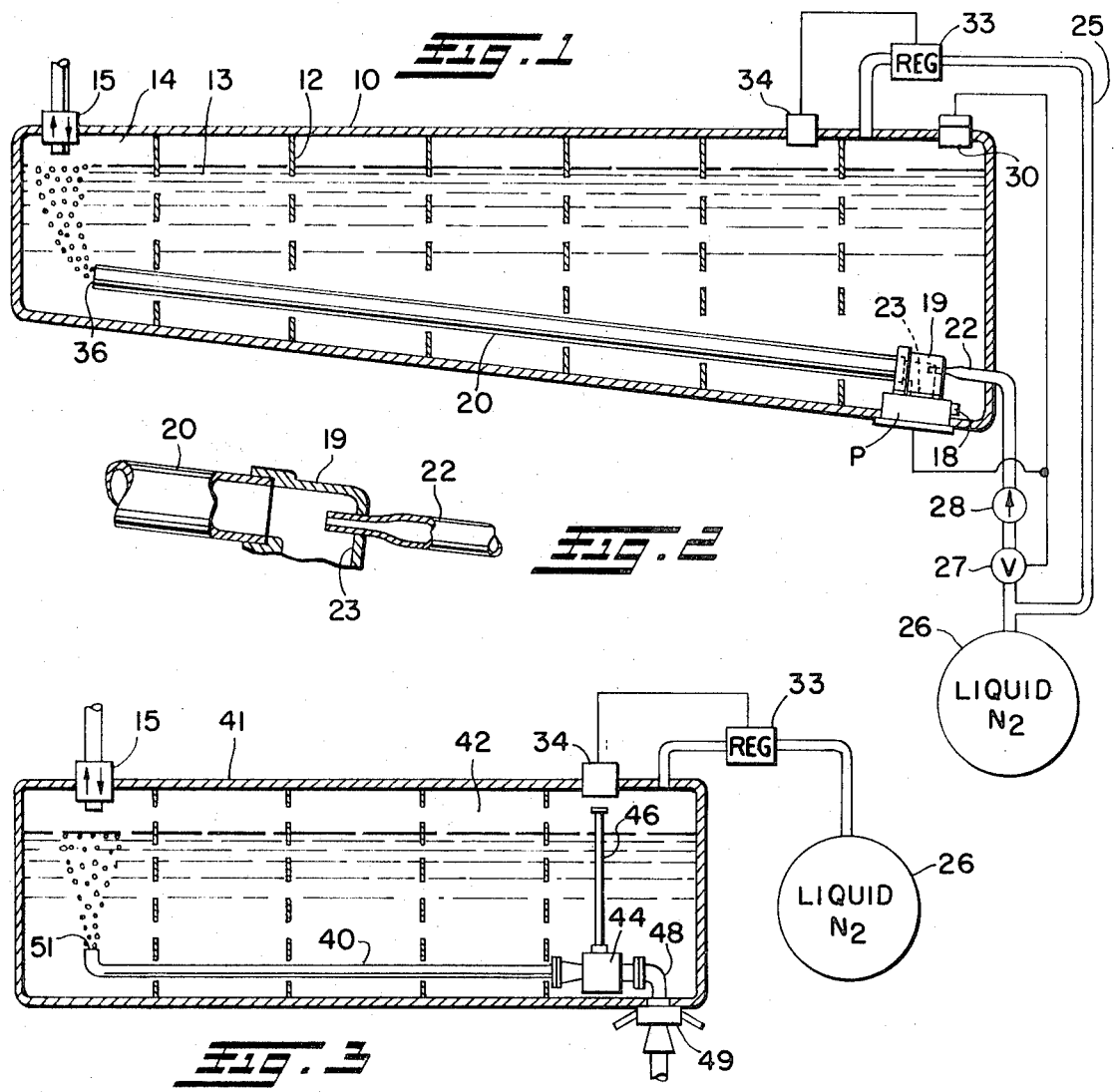
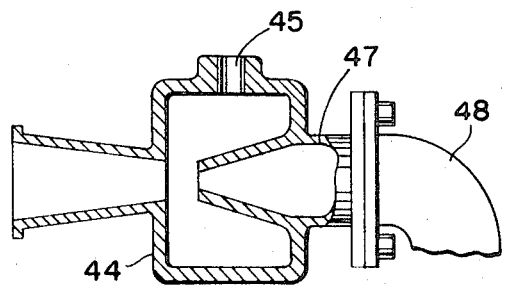
INVENTOR.
RICHARD A. NICHOLS
BY
Oberlin, Maky, Donnelly & Renner
ATTORNEYS

FUEL TANK INERTING SYSTEM

BACKGROUND OF THE INVENTION

It is known that to render the vapor space of an aircraft fuel tank immune to fire or explosion an inert gas, such as nitrogen, may be introduced therein to dilute the oxygen content of the vapor space to 12 percent or less. It is also known that liquid fuel stored at ground level atmospheric pressure will have dissolved therein a quantity of $O_2$ dependent upon such pressure. When such fuel is placed in an aircraft tank some of the $O_2$ will come out of solution and enter the vapor space when the tank pressure is reduced so as to remain at substantially ambient atmospheric pressure as the aircraft climbs. The $O_2$ thus coming out of solution enters the vapor space and may increase the oxygen content thereof to above 12 percent even though the vapor space contains nitrogen. To avoid the latter possibility it has been heretofore proposed to remove $O_2$ from the fuel by scrubbing it with nitrogen either during the operation of filling an aircraft tank, as disclosed in U.S. Pat. No. 3,229,446, or during flight as the aircraft ascends, as disclosed in application Ser. No. 711,020, now U.S. Pat. No. 3,590,559. In Pat. No. 3,229,446, the tank is filled through a tube of restricted diameter into which nitrogen is introduced. Use of a tube of restricted diameter has the disadvantage of requiring high pumping pressure for filling the tank. In Pat, No. 3,590,559 there is a manifold within the tank into which nitrogen is periodically admitted during ascent of the aircraft and expelled into the body of fuel through a plurality of nozzles in a manner to create a wide dispersion of nitrogen bubbles within the body of fuel which scrub oxygen from the fuel as the bubbles rise to the ullage. A disadvantage of this method is that for tanks that are either shallow or baffled to form many compartments a large number of nozzles is required to provide adequate scrubbing action.

SUMMARY OF THE INVENTION

The present invention provides a simple and effective method of scrubbing $O_2$ from the fuel either during the filling operation without requiring restricted flow at high pressure or during flight without requiring a large number of nozzles. In either case this is accomplished by passing the fuel through a mixing chamber and an elongated tube at a high flow rate with low pressure drop and with the nitrogen injected into the chamber at substantially 90° to the direction of fuel flow, and discharging the fuel nitrogen mixture into the tank near the bottom thereof. In each case substantially all the scrubbing occurs in the mixing chamber and the tube. During flight, the pump for recirculating the fuel has substantially all its output circulated through the tube.

BRIEF DESCRIPTION OF THE DRAWINGS

FIG. 1 is a diagrammatic view of an aircraft fuel tank fitted with a tube scrub system for use while the aircraft is climbing.

FIG. 2 is a cross section view of an elbow fitting used in conjunction with FIG. 1.

FIG. 3 is a diagrammatic view of an aircraft fuel tank fitted with a tube scrub system for use while the tank is being filled with fuel.

FIG. 4 is a cross section of an aspirating type nozzle used in conjunction with FIG. 3.

DESCRIPTION OF THE INVENTION

As shown in FIG. 1, a shallow aircraft tank 10 having a series of perforated vertical baffles 12 contains a body of liquid fuel 13 with a shallow vapor space 14 above the fuel. A vent valve 15 is normally closed but permits reduction of tank pressure by outflow of gases from the tank when ambient pressure is below tank pressure by a predetermined amount and permits inflow of air under emergency conditions when ambient pressure exceeds tank pressure by a selected amount.

Mounted within the tank is a pump P of high volume, low pressure type, as for example 100 GPM flow at 5 PSI discharge pressure. The pump has an inlet 18 near the bottom of the tank and discharges into an elbow fitting 19 to which an elongated tube 20 is connected. An injection tube 22 enters the elbow in a direction about right angles to the axis of elbow inlet opening 23.

Tube 22 is also connected to a conduit 25 leading from a dewar 26 containing liquid nitrogen and which contains a regulator valve 27 and a check valve 28 for controlling flow of nitrogen from the dewar to fitting 19. Pump P and valve 27 are actuated for selected time intervals by electrical means controlled by a sensing device and timer 30 that may respond either to changes of tank pressure or altitude.

Conduit 25 also connects to the tank by way of a regulator valve 33 controlled by a pressure differential device 34 that opens valve 33 to admit nitrogen for raising the tank pressure to keep it substantially the same as atmospheric pressure, as during descent of the aircraft.

As the aircraft ascends and the tank pressure decreases by venting of ullage gases through valve 15, some of the oxygen dissolved in the fuel tends to come out of solution in accordance with the law of gas partial pressures and rise to the tank ullage. This might not occur in a uniform or progressive manner and the excess oxygen within the fuel may remain therein in a supersaturated condition until released by buffeting of the aircraft or other reason. To assure removal of the excess oxygen at controlled times and its dilution with nitrogen below the flammability level, sensor 30 opens valve 27 and actuates pump P at the selected tank pressure or altitude conditions. The pump takes in fuel from the tank through its inlet 18 and discharges it into elbow 19 into which nitrogen from tube 22 is simultaneously injected. The fuel and nitrogen mix within elbow 19 and further thorough mixing is accomplished as the fuel and nitrogen pass through tube 20 so that thorough scrubbing of the excess oxygen from the fuel within tube 20 is accomplished before it is discharged into the tank through the open end 36 of the tube. The diameter of tube 20 is not restricted whereby fuel in high volume and low pressure as indicated may be delivered therethrough, the length of the tube in itself providing sufficient pressure drop to result in turbulent flow and thorough mixing of the fuel and nitrogen. This open end is in close proximity to vent valve 15 and remote from intake 18 whereby the gases being vented which although still in non-flammable proportions will contain a larger amount of oxygen than gases in parts of the ullage more remote from the tube discharge end 36, and the fuel taken into the pump through inlet 18 will have a greater concentration of oxygen than in parts of the tank into which scrubbed fuel has entered.

In this manner, pump P may be operated for such period of time as is required for removing enough oxygen from the fuel at any given tank pressure or altitude to prevent dangerous enrichment of the gases in the vapor space with oxygen emerging from the fuel due to lowered tank pressure.

FIG. 3 illustrates the use of a scrubbing tube 40 within an aircraft tank 41 while the latter is being filled. In such case, the tank vapor space 42 contains an inert mixture of nitrogen, oxygen and fuel vapor due to pressurizing of the tank with nitrogen from a dewar 26 and the use of a regulating valve 33 under the control of a pressure differential device 34 in the manner described in connection with FIG. 1. There is likewise a vent valve 15 for controlling outflow of gases from vapor space 42, and for inflow of air under emergency conditions as when the supply of nitrogen fails for any reason.

Tube 40 is connected at one end to an aspirating type nozzle 44 that has a suction port 45 connected by a conduit 46 to vapor space 42, and which has an inlet port 47 connected to a tank fitting 48 to which a refueling nozzle 49 may be connected.

As fuel is supplied through nozzle 49, it passes through aspirator 44 and into tube 40. As it passes through aspirator 44, a suction is created in port 45 that draws in the inert gas mixture from vapor space 42 to discharge the same into tube 40 where it mixes with the fuel to scrub oxygen therefrom. The scrubbed fuel and the inert gas mixture with the additional oxygen therein emerges from the open end 51 of the tube 40 and the gaseous mixture rises to the vapor space 42 in the vicinity of vent valve 15. Some of this gaseous mixture remains in the tank vapor space and the remainder is vented through valve 15 as the tank fills with fuel.

For some tanks that are relatively tall as compared to their length and width, it is sometimes possible to scrub the fuel during flight without the use of elongated tube 20 shown in FIG. 1 but simply recirculate the fuel through elbow 19 where it is mixed with nitrogen and discharged directly into the tank.

I, therefore, particularly point out and distinctly claim as my invention:

1. An inerting system for an aircraft fuel tank containing a body of liquid fuel with oxygen dissolved therein, comprising a housing having a chamber with an inlet and an unrestricted outlet, a high volume low pressure pump having an inlet connected to the body of liquid fuel and an outlet connected only to said chamber inlet, a source of inert gas and means for supplying same connected to said chamber adjacent to said chamber inlet whereby all the fuel passing through the pump is delivered thereby to said chamber for mixing with said inert gas for discharge of the fuel-inert gas mixture from said chamber outlet into said tank.

2. The system of claim 1 in which said chamber outlet includes an elongated tube.

3. The system of claim 2 in which said tube and said chamber both serve as mixing chambers for thoroughly mixing the inert gas with the fuel therein whereby oxygen dissolved in the fuel passing through the chamber and tube will be scrubbed from the fuel and mixed with the inert gas for discharge from the tube to the tank.

4. The system of claim 3 in which the discharge end of the tube is remote from the pump inlet.

5. The system of claim 4 in which the tank has a vent valve located near the discharge end of the tube and connecting a vapor space in the tank to atmosphere when fluid pressure in the vapor space is greater than ambient atmosphere pressure.

6. The system of claim 1 in which the chamber outlet is located at the bottom of the tank.

7. The system of claim 1 in which there is a control means actuating the pump and said means for supplying inert gas to said chamber.

8. The system of claim 7 in which operation of said control means is in response to reduction of pressure in said tank.

* * * * *